2,908,599

FLUXING OR DEOXIDIZING ATMOSPHERE

Charles A. Medsker, Avon, Ohio

No Drawing. Application April 5, 1957
Serial No. 650,845

7 Claims. (Cl. 148—23)

This invention pertains to a liquid which is a new article of manufacture for providing a fluxing or deoxidizing atmosphere.

This application is a continuation-in-part of a previous application, Serial Number 573,319, filed March 23, 1956, now abandoned, for Fluxing or Deoxidizing Atmosphere.

Any gaseous fuel such as acetylene, natural gas, propane, hydrogen or the like, may be passed through the liquid of this invention where it becomes saturated with the vapor of the liquid providing a fluxing action when the fuel is subsequently burned. This fuel mixture may be used for any heating action but it is particularly useful for heating and welding torches; and any gaseous inert atmospheres such as nitrogen, carbon dioxide, helium, argon, disassociated ammonia or the like, may be passed through the liquid where it becomes saturated with the vapor of the liquid to provide a deoxidizing atmosphere with or without a fluxing action.

Since one of the more important uses of the new liquid is in a fuel for torch use where it acts both as a fuel and fluxing agent, the following description will be in connection with such use. However, it is to be understood that the herein claimed liquid may be used as a fuel in other than torch applications, and may be mixed with inert gases to form a deoxidizing atmosphere with or without a fluxing action.

The liquid of this invention is a mixture of a borate ester and hexane. One of the best of the borate esters is tri-methyl borate, either as an azeotrope with alcohol, such as methyl alcohol, or by itself, and the hexane may be normal hexane or one of its isomers. While the tri-methyl borate is preferred due to present day economies, the mono and di-methyl borates may be used. Preferably the liquid contains about 68% of a borate ester and about 32% hexane, though amounts of hexane ranging from 20% to 40% give useful benefits. Above 40% hexane carbonization sets in with consequent disadvantages. Below 20% hexane the benefits of the invention are not enough to be commercially useful.

Approximately 32% hexane, balance borate ester, appears to be the best mixture because this mixture, throughout its use, remains substantially constantly the same. That is, it will entrain in a fuel in the same proportion 68:32.

It is to be realized that commercial hexane is not all hexane, in this application the term "hexane" includes the commercial varieties which sometimes contain as much as 15% octane, heptane, and other fractions.

Prior to this invention methyl borate and acetone have been used in a fuel for torch use. See Patent 2,281,910. This mixture has been successful over a period of years. However, it has been discovered that a mixture of methyl borate, especially tri-methyl borate, with hexane establishes an additive for a gaseous fuel which is far superior to the methyl borate-acetone mixture. One of the reasons for the marked superiority of the new additive is that the hexane has a much higher heat of combustion than the acetone; the heat of combustion of acetone being 426.8 cal./kilogram whereas the heat of combustion of hexane is 990 cal./kilogram, over twice as high as that of acetone.

When acetone is mixed with methyl borate as an additive to reduce the percentage of boron and added to a gaseous fuel such as acetylene and burned in a torch it cools the flame, though it permits the boron to do a good job of fluxing. The hexane of this invention similarly acts as a dilutant, but in addition it increases the heat of the flame over the acetone.

When hexane is mixed with a borate ester such as methyl borate and added to a gaseous fuel such as acetylene it greatly improves the torch action due to its very high heat of combustion and it also improves the fluxing. Since an appreciable amount of the borate ester-hexane mixture is delivered to the tip of the torch its improved qualities lead to a quicker torch job with consequent savings in operator time and fuel.

The borate ester to which the hexane is added may be in the form of the compounds themselves, or in the form of their azeotropes with corresponding alcohols. For example, an outstanding borate ester to be mixed with hexane is the azeotrope of about 72% tri-methyl borate and about 28% methyl alcohol. This azeotrope, when mixed with normal hexane or its isomers forms a new azeotrope with outstanding qualities when it is subsequently mixed with a gaseous fuel for flux applications or with an inert atmosphere for deoxidizing and fluxing applications.

The boiling point of normal hexane, $C_6H_{14}$, is 69° C., which seems too high for its use, but the boiling point of the ternary azeotrope with methyl borate and alcohol is about 51–54° C. which is excellent. An acetylene (or other gas) and oxygen or air are used with a flux-mixing device (commonly called a fluxer) it is important that the liquid in the device be uniformly vaporized or entrained in the fuel. If it is not uniformly mixed in the fuel a variable percentage of the liquid will be in the resultant fuel (or other gas). This is highly undesirable. It has been found that the borate ester-hexane liquid of this invention, and particularly the tri-methyl borate-hexane azeotrope, is excellent in this respect. All components of the azeotrope evaporate uniformly into the gas passing through the flux mixing device, resulting in a uniform output mixture. Furthermore, the rate of evaporation of the azeotrope is uniform over a long period of time so that the output gas is the same at the beginning of the day as it is at the end of a day. This results in a constant boron composition even though the ratio of the fuel gas to the flux liquid may be varied. This, in the case of torch fuel, aids the operator to do more uniform work over a longer period of time than has heretofore been possible.

Throughout the description and claims the term "hexane" has been used. This term, as used, embraces pure hexane and mixtures sold commercially as hexane. For example, one commercially available "hexane" comprises 55.7% normal hexane, 36.4% isomers of hexane and 7.9% impurities such as benzine, etc.

For a detailed description of the mixing apparatus reference may be made to Patent No. 2,223,456, issued December 3, 1940 to Charles A. Medsker.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A liquid consisting essentially of a mixture of a borate ester and 20% to 40% hexane.
2. A liquid consisting essentially of a mixture of about 68% of a borate ester and 32% of hexane.
3. A liquid consisting essentially of a mixture of tri-methyl borate and about 32% hexane.
4. A liquid consisting essentially of tri-methyl borate-methyl alcohol azeotrope and 20% to 40% hexane.
5. A liquid consisting essentially of about 32% hexane and tri-methyl borate-methyl alcohol azeotrope which is about 72% methyl borate and about 28% methyl alcohol.
6. A liquid which, in its gaseous state, is for entrainment in a gaseous fuel, said liquid containing 20% to 40% hexane and the balance substantially all a borate ester.
7. A liquid as set forth in claim 6, further characterized by said borate ester being tri-methyl borate.

References Cited in the file of this patent

UNITED STATES PATENTS 2,211,448  Vanghn _____ Aug. 13, 1940
2,262,187  Lytle et al. _____ Nov. 11, 1941

OTHER REFERENCES

Gregory: Vol. 1, page 311, 1939, Uses and Application of Chemical and Related Materials.